United States Patent
Katti et al.

(10) Patent No.: US 7,376,952 B2
(45) Date of Patent: May 20, 2008

(54) OPTIMIZING CRITICAL SECTION MICROBLOCKS BY CONTROLLING THREAD EXECUTION

(75) Inventors: Gururaj M. Katti, Karnataka (IN); K. V. Krishnam Raju, Karnataka (IN); Shreekanth Patel, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 848 days.

(21) Appl. No.: 10/662,242

(22) Filed: Sep. 15, 2003

(65) Prior Publication Data

US 2005/0060705 A1    Mar. 17, 2005

(51) Int. Cl.
*G06F 9/46* (2006.01)
*G06F 9/455* (2006.01)
*G06F 15/16* (2006.01)

(52) U.S. Cl. .................. 718/102; 718/1; 718/100; 709/248

(58) Field of Classification Search ........ 718/100–108, 718/1; 712/203; 709/248
See application file for complete search history.

(56) References Cited

U.S. PATENT DOCUMENTS

| | | | |
|---|---|---|---|
| 6,625,654 B1 | 9/2003 | Wolrich et al. ............. 709/230 |
| 6,629,237 B2 | 9/2003 | Wolrich et al. ............. 712/228 |
| 6,845,504 B2 * | 1/2005 | Hua et al. .................. 718/104 |
| 6,934,951 B2 * | 8/2005 | Wilkinson et al. .......... 718/107 |
| 7,178,062 B1 * | 2/2007 | Dice ........................... 714/38 |
| 2003/0135351 A1 * | 7/2003 | Wilkinson et al. .......... 702/186 |
| 2003/0231645 A1 | 12/2003 | Chandra et al. ............ 370/412 |
| 2004/0064580 A1 | 4/2004 | Lim et al. ................... 709/238 |
| 2004/0246956 A1 * | 12/2004 | Meng ......................... 370/389 |
| 2004/0246980 A1 * | 12/2004 | Balakrishnan ............. 370/412 |
| 2005/0047439 A1 * | 3/2005 | Madajczak ................. 370/469 |
| 2005/0216710 A1 * | 9/2005 | Wilkinson et al. .......... 712/228 |

* cited by examiner

*Primary Examiner*—Meng-Ai An
*Assistant Examiner*—Eric C Wai
(74) *Attorney, Agent, or Firm*—Daly, Crowley, Mofford & Durkee, LLP

(57) ABSTRACT

Processors having multiple threads of execution are configured to execute a critical section of code, which the processors execute in turns. The threads of execution are controlled to avoid occurrence of idle time between execution of the critical section by the processors. In particular, the control of the execution threads maintains thread ordering as well as ensures that a context swap occurs after the critical section execution has been completed by each thread of execution.

22 Claims, 14 Drawing Sheets

| Register Name | Latency in terms of instructions | | Usage Latency Comments |
| --- | --- | --- | --- |
| | Write | Read | Usage | |
| SAME_ME_SIGNAL 82 | 3 | 2 | 8 | The same ME will be signaled 8 cycles after the CSR write. |

FIG. 6

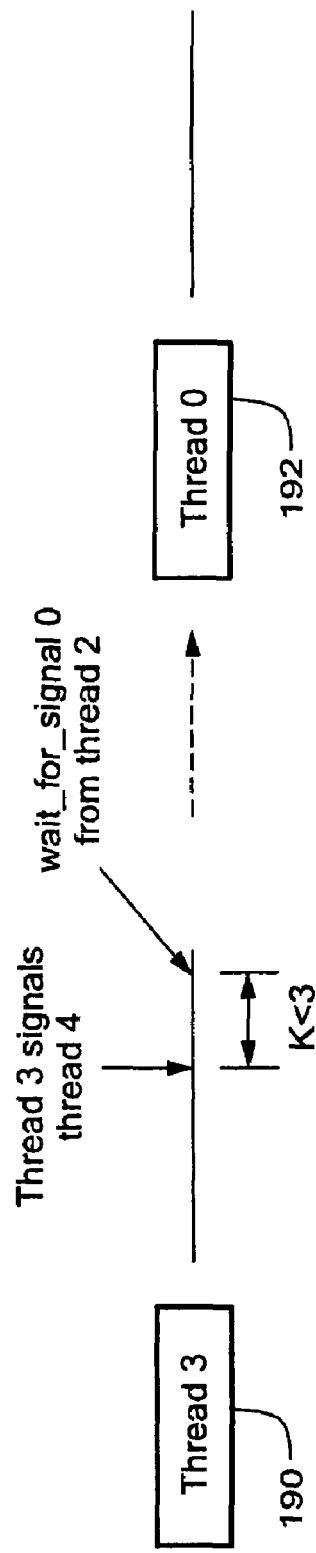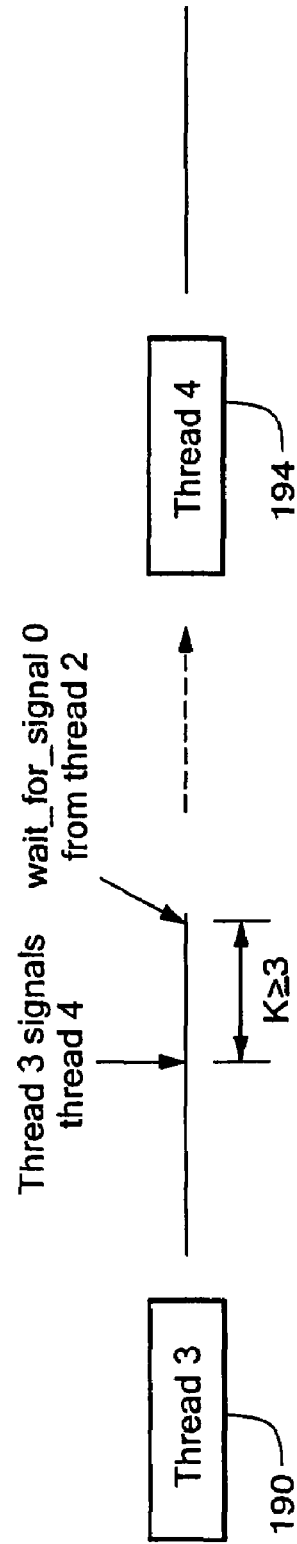

OPTIMIZING CRITICAL SECTION MICROBLOCKS BY CONTROLLING THREAD EXECUTION

BACKGROUND

In multi-threaded, multi-processor applications, such as networking applications, data integrity for a so-called "critical section" of a program, that is, a code section for which only one thread has exclusive modification privileges for a global resource (e.g., a buffer memory) at any one time, can be maintained by allowing only one execution thread on one processor to execute the critical section at any given time. This restriction protects coherency during read-modify-write operations. Ownership of the critical section can be passed from thread to thread and processor to processor through the use of various signaling mechanisms.

DESCRIPTION OF DRAWINGS

FIG. 6 is a table showing inter-thread signaling latencies.

FIGS. 10A and 10B show propagation of inter-thread signaling under conditions in which thread ordering is not preserved (FIG. 10A) and under conditions in which thread ordering is maintained (FIG. 10B).

DETAILED DESCRIPTION

Figure 1:
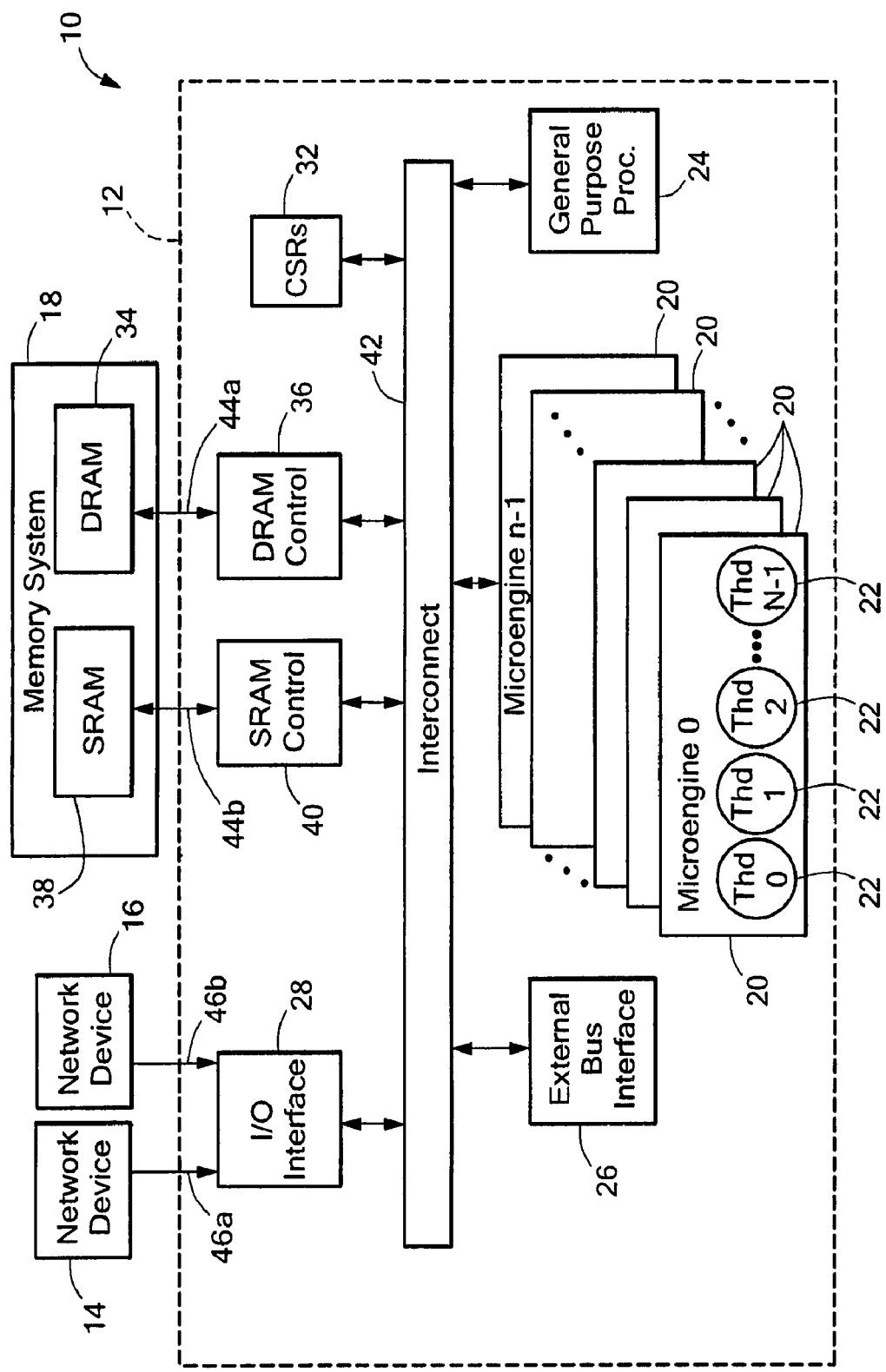
FIG. 1 is a block diagram of a communication system employing a processor having multithreaded microengines (MEs) to support multiple threads of execution.

Referring to FIG. 1, a communication system 10 includes a processor 12 coupled to one or more I/O devices, for example, network devices 14 and 16, as well as a memory system 18. The processor 12 includes multiple processors ("microengines" or "MEs") 20, each with multiple hardware controlled execution threads 22. In the example shown, there are "n" microengines 20, and each of the microengines 20 is capable of processing multiple threads 22, as will be described more fully below. In the described embodiment, the maximum number "N" of threads supported by the hardware is eight. Each of the microengines 20 is connected to and can communicate with adjacent microengines. The microengines 20 employ an optimized signaling mechanism to control thread execution for improved performance, as will be described.

In one embodiment, the processor 12 also includes a processor 24 that assists in loading microcode control for the microengines 20 and other resources of the processor 12, and performs other general-purpose computer type functions such as handling protocols and exceptions. In network processing applications, the processor 24 can also provide support for higher layer network processing tasks that cannot be handled by the microengines 20.

The microengines 20 each operate with shared resources including, for example, the memory system 18, an external bus interface (e.g., a Peripheral Chip Interconnect or "PCI" bus interface) 26, an I/O interface 28 and Control and Status Registers (CSRs) 32. The I/O interface 28 is responsible for controlling and interfacing the processor 12 to the network devices 14, 16. The memory system 18 includes a Dynamic Random Access Memory (DRAM) 34, which is accessed using a DRAM controller 36 and a Static Random Access Memory (SRAM) 38, which is accessed using an SRAM controller 40. Although not shown, the processor 12 also would include a nonvolatile memory to support boot operations. The DRAM 34 and DRAM controller 36 are typically used for processing large volumes of data, e.g., processing of payloads from network packets. In a networking implementation, the SRAM 38 and SRAM controller 40 are used for low latency, fast access tasks, e.g., accessing look-up tables, storing buffer descriptors and free buffer lists, and so forth.

The devices 14 and 16 can be any network devices capable of transmitting and/or receiving network traffic data, such as framing/Media Access Control (MAC) devices, e.g., for connecting to 10/100BaseT Ethernet, Gigabit Ethernet, Asynchronous Transfer Mode (ATM) or other types of networks, or devices for connecting to a switch fabric. For example, in one arrangement, the network device 14 could be an Ethernet MAC device (connected to an Ethernet network, not shown) that transmits data to the processor 12 and device 16 could be a switch fabric device that receives processed data from processor 12 for transmission onto a switch fabric. In such an implementation, that is, when handling traffic to be sent to a switch fabric, the processor 12 would be acting as an ingress network processor. Alternatively, the processor 12 could operate as an egress network processor, handling traffic that is received from a switch fabric (via device 16) and destined for another network device such as network device 14, or network coupled to such device.

Although the processor 12 can operate in a standalone mode, supporting both traffic directions, it will be understood that, to achieve higher performance, it may be desirable to use two dedicated processors, one as an ingress processor and the other as an egress processor. The two dedicated processors would each be coupled to the devices 14 and 16. In addition, each network device 14, 16 can include a plurality of ports to be serviced by the processor 12. The I/O interface 28 therefore supports one or more types of interfaces, such as an interface for packet and cell transfer between a PHY device and a higher protocol layer (e.g., link layer), or an interface between a traffic manager and a switch fabric for Asynchronous Transfer Mode (ATM), Internet Protocol (IP), Ethernet, and similar data communications applications. The I/O interface 28 may include separate receive and transmit blocks, and each may be separately configurable for a particular interface supported by the processor 12.

Other devices, such as a host computer and/or bus peripherals (not shown), which may be coupled to an external bus controlled by the external bus interface 26 can also serviced by the processor 12.

In general, as a network processor, the processor 12 can interface to any type of communication device or interface that receives/sends data. The processor 12 functioning as a network processor could receive units of information from a network device like network device 14 and process those units in a parallel manner, as will be described. The unit of information could include an entire network packet (e.g., Ethernet packet) or a portion of such a packet, e.g., a cell such as a Common Switch Interface (or "CSIX") cell or ATM cell, or packet segment. Other units are contemplated as well. Hereafter, the units of information operated on by the microengines 20, will be referred to as "data units".

Each of the functional units of the processor 12 is coupled to an internal bus structure or interconnect 42. Memory busses 44a, 44b couple the memory controllers 36 and 40, respectively, to respective memory units DRAM 34 and SRAM 38 of the memory system 18. The I/O Interface 28 is coupled to the devices 14 and 16 via separate I/O bus lines 46a and 46b, respectively.

Figure 2:
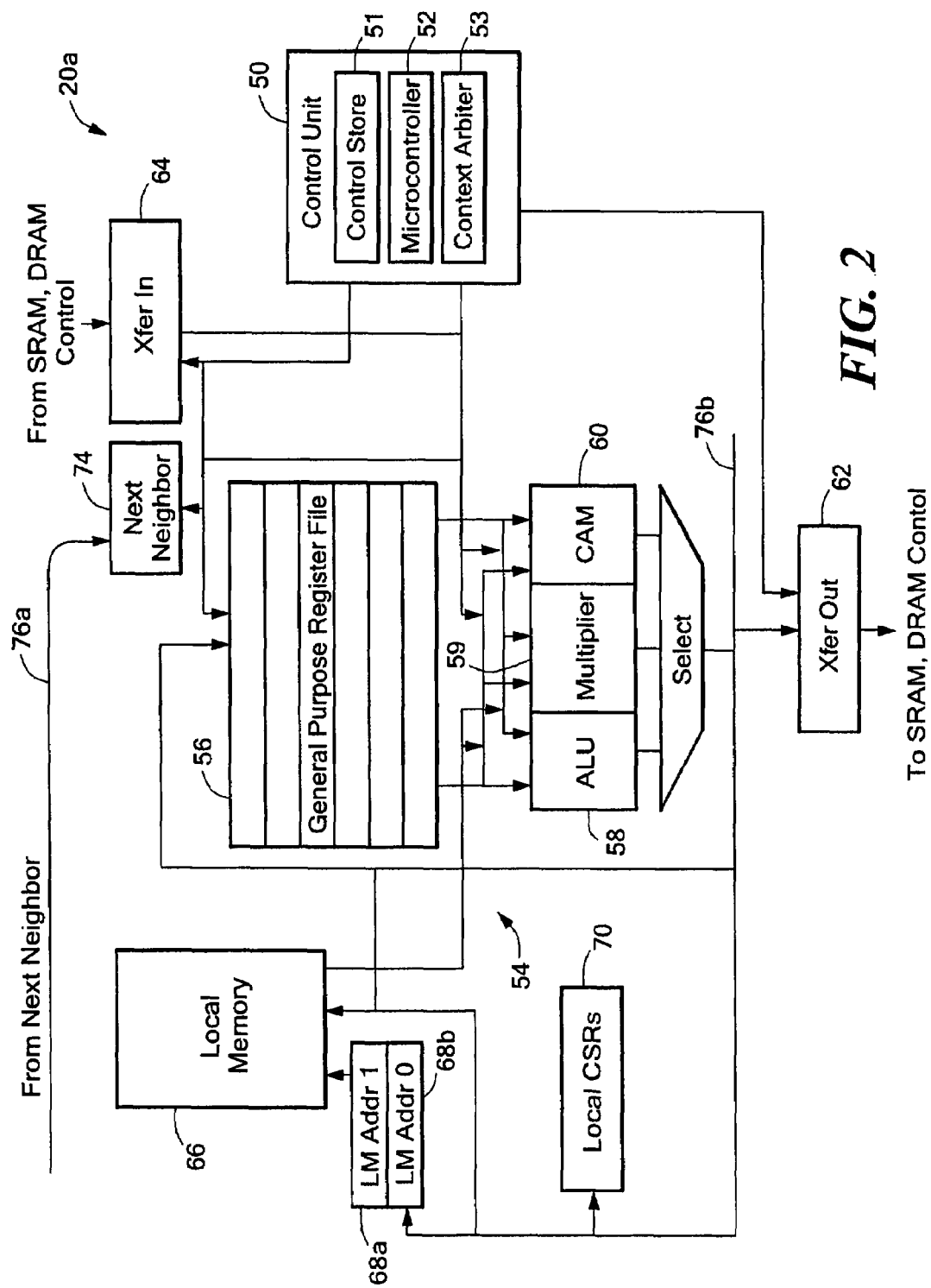
FIG. 2 is a block diagram of an exemplary microengine (ME).

Referring to FIG. 2, an exemplary one of the microengines 20, ME 20a, is shown. The microengine (ME) 20a includes a control unit 50 that includes a control store 51, control logic (or microcontroller) 52 and a context arbiter/event logic 53. The control store 51 is used to store a microprogram. The microprogram is loadable by the processor 24.

The microcontroller 52 includes an instruction decoder and program counter units for each of the supported threads. The context arbiter/event logic 53 can receive messages from any of the shared resources, e.g., SRAM 38, DRAM 34, or processor core 24, and so forth. These messages provides information on whether a requested function has been completed.

The microengine 20 also includes an execution datapath 54 and a general purpose register (GPR) file unit 56 that is coupled to the control unit 50. The datapath 54 may include a number of different datapath elements, e.g., and as shown, an ALU 58, a multiplier 59 and a Content Addressable Memory (CAM) 60.

The registers of the GPR file unit 56 are read and written exclusively under program control. The GPRs, when used as a source in an instruction, supply operands to the datapath 54. When used as a destination in an instruction, they are written with the result of the datapath 54. The instruction specifies the register number of the specific GPRs that are selected for a source or destination. Opcode bits in the instruction provided by the control unit 50 select which datapath element is to perform the operation defined by the instruction.

The microengine 20a further includes a write transfer register file 62 and a read transfer register file 64. The write transfer register file 62 stores data to be written to a resource external to the microengine (for example, the DRAM memory or SRAM memory). The read transfer register file 64 is used for storing return data from a resource external to the microengine 20a. Both of the transfer register files 62, 64 are connected to the datapath 54, as well as the control store 50.

Also included in the microengine 20a is a local memory 66. The local memory 66 is addressed by registers 68a, 68b, which supplies operands to the datapath 54, and receives results from the datapath 54 as a destination.

The microengine 20a also includes local control and status registers (CSRs) 70, coupled to the transfer registers, for storing local inter-thread and global event signaling information, as well as other control and status information. Other storage and functions units, for example, a Cyclic Redundancy Check (CRC) unit (not shown), may be included in the microengine as well.

The microengine 20a also includes next neighbor registers 74, coupled to the control store 50 and the execution datapath 54, for storing information received from a previous neighbor ME in pipeline processing over a next neighbor input signal 76a, or from the same ME, as controlled by information in the local CSRs 70. A next neighbor output signal 76b to a next neighbor ME in a processing pipeline can be provided under the control of the local CSRs 70.

At any give time, each of the threads (or contexts) of a given ME is in one of four states: inactive; executing; ready and sleep. At most one thread can be in the executing state at a time.

Figure 3:
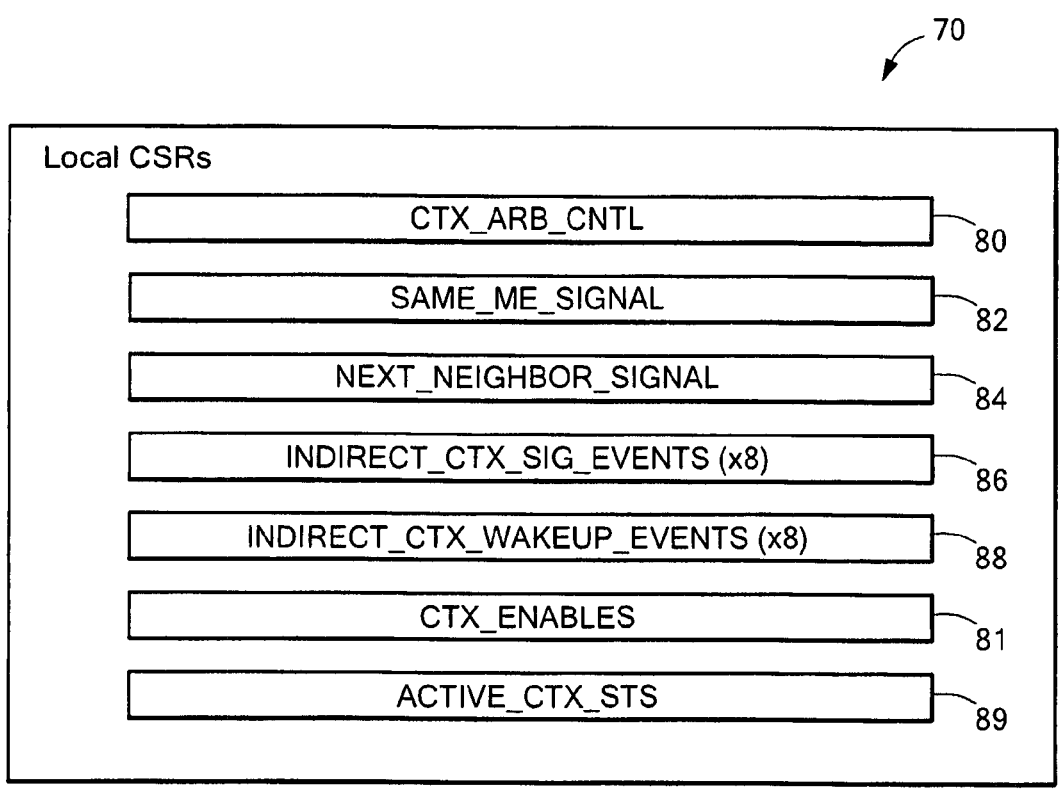
FIG. 3 shows Control and Status Registers (CSRs) residing locally in the microengine (of FIG. 2).

Generally, the local CSRs 70 are used to maintain context state information and inter-thread signaling information. FIG. 3 shows a more detailed view of the local CSRs 70. The local CSRs include the following registers or groups of registers: CTX_ARB_CNTL 80; CTX_ENABLES 81; SAME_ME_SIGNAL 82; NEXT_NEIGHBOR_SIGNAL 84; INDIRECT_CTX_SIG_EVENTS 86; INDIRECT_CTX_SIG_EVENTS 88; ACTIVE_CTX_STS 89; and other registers not shown. The INDIRECT_CTX_SIG_EVENT registers 86 and INDIRECT_CTX_WAKEUP_EVENT registers 88 represent groups of registers, and include one register for each of the n different contexts supported on an ME.

Still referring to FIG. 3, the CTX_ARB_CNTL CSR 80 is used by the context arbiter 53 to identify the next context to execute. The CTX_ENABLES register 81 specifies, among other information, the number of contexts in use (which determines GPR and transfer register allocation) and which contexts are enable. The SAME_ME_SIGNAL CSR 82 can be used by a thread to signal another thread on the same ME. The NEXT_NEIGHBOR_SIGNAL CSR 84 allows a thread to signal a thread in the next neighbor ME. The INDIRECT_CTX_SIG_EVENTS registers 86 are used to maintain status information indicating which event signals have occurred for contexts 0 through 7. The INDIRECT_CTX_WAKEUP_EVENTS 88 maintain status information indicating which event signals are required to put each of the contexts in the ready state. The ACTIVE_CTX_STS CSR 89 maintains information identifying those contexts that are currently active.

A context is in the executing state when its context number is set the ACTIVE_CTX_STS 89. A context remains in this state until it executes an instruction (e.g., a context arbitration "CTX_ARB" instruction) that causes it to go to the sleep state. In the ready state, a context is ready to execute but does not because a different context is executing. When the executing context goes to sleep, the ME context arbiter 53 selects the next context to go to the executing state from among the contexts in the ready state. In the sleep state, a context is waiting for an external event (specified in its INDIRECT_WAKEUP_EVENTS CSR 88) to occur. In this state the context does not arbitrate to enter the executing state. A context is in the inactive state when its enable bit in the CTX_ENABLES CSR 81 is not set. A microengine is idle whenever all of its threads are in either inactive or sleep states. For example, an ME will be idle when a context swap has been executed, but no context is ready to wake up.

The CTX_ARB instruction is of the format: ctx_arb[]. The instruction swaps out the currently running context to let another context execute. This activity is also referred to as a context switch. The swapped out context wakes up when the conditions specified in the parameter [ ] are met, for example, if specified signal(s) provided by the parameter are activated. If threads are specified, the swapped out context (now in sleep state) is placed in the ready state when all of the specified signals are received. If the parameter is specified as "voluntary", the swapped out context is placed back in ready state in one cycle.

Thus, a thread on a multi-threaded processor such as ME 20 can issue an instruction and then swap out, allowing another thread within the same ME to run. While one thread is waiting for data, or some operation to complete, another thread is allowed to run and complete useful work. When the instruction is complete, the thread that issued it is signaled, which causes that thread to be put in the ready state when it receives the signal. Context switching occurs only when an executing thread explicitly gives up control. The CTX_ARB instruction allows the context arbiter to determine which thread runs next, as mentioned earlier. Thus, the thread that has transitioned to the sleep state after executing and is waiting for a signal is, for all practical purposes, temporarily disabled (for arbitration) until the signal is received.

Some sets of registers in the local CSRs, e.g., the INDIRECT_CTX_SIG_EVENT registers 86 and INDIRECT_CTX_WAKEUP_EVENT registers 88, include a register for each of the ME contexts. When a context starts executing, the per-context register is copied into a working (or active) register in the GPRs 56. When that context stops executing, the working register is saved back into the per-context register.

One way that inter-thread signaling on the same ME can occur is by using the SAME_ME_SIGNAL CSR 82. The data in this register is used to select which context and signal number is set. Inter-thread, inter-ME signaling can occur in a number of different ways. For example, a thread on an ME can signal a thread on the next ME via the NEXT_NEIGHBOR_SIGNAL CSR 84. The data stored in this register is used to select which context and event signal is set. Alternatively, threads on different MEs can communicate by storing messages in registers in external CSRs ("fast write" CSRs) 30, shown in FIG. 1.

Figure 4:
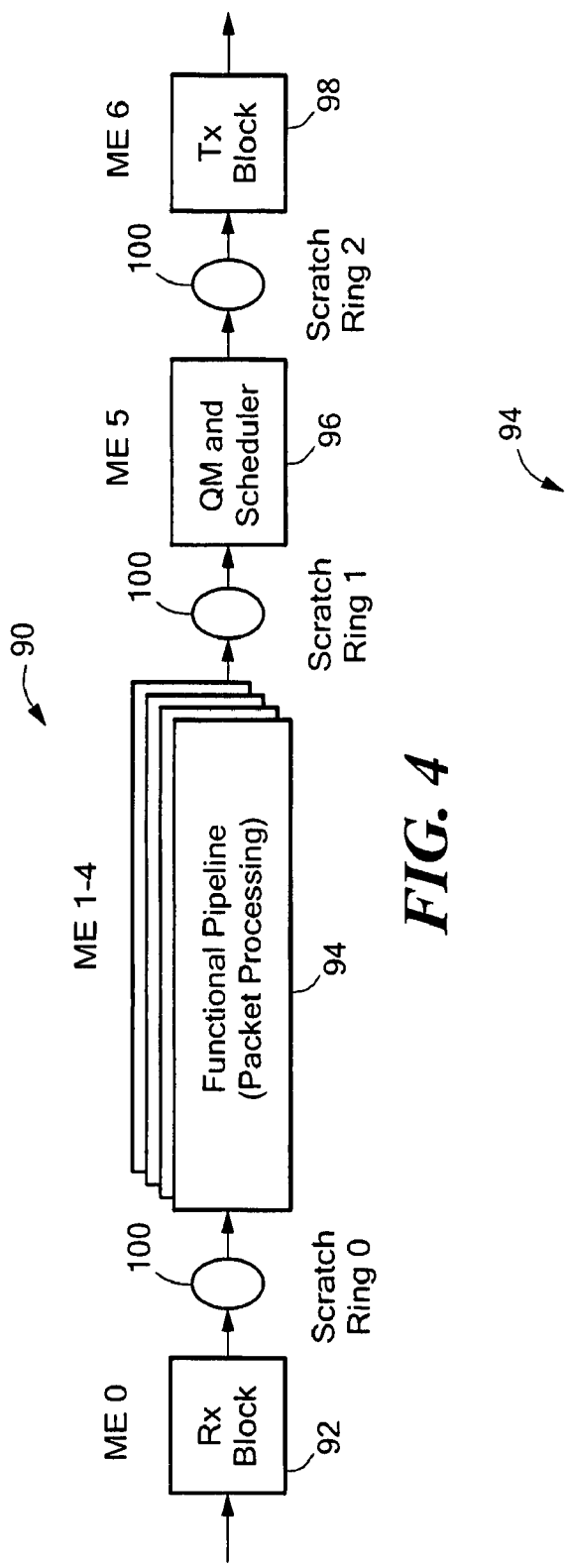
FIG. 4 shows a multi-stage, processing pipeline in which multiple microengines perform one or more critical sections of code in a functional pipeline for a networking application.

The functionality of the microengine threads 22 is determined by microcode loaded (via the core processor 24) for a particular user's application into each microengine's control store 51. Referring to FIG. 4, an exemplary ME task assignment for a software pipeline model of the processor 12 programmed to run a particular network application is illustrated in 90. In this embodiment, the processor 12 supports the following: a receive ("Rx") microblock 92 which executes on single microengine (ME 0); a functional pipeline 94 of multiple microblocks(that perform packet processing, e.g., such operations as packet classification, packet forwarding, differentiated services or "Diffserv" processing), which runs on four MEs (shown as MEs 1 through 4); a queue manager and scheduler microblock 96 which executes on a sixth ME (ME 5); and a transmit ("Tx") microblock 98 which executes on a seventh ME (ME 6). The single microblock ME stages (e.g., microblocks 92,98) are referred to as context pipestages. Scratch rings 100 are used to pass information between context pipestages, and to pass information between context pipestages and functional pipelines.

Figure 5:
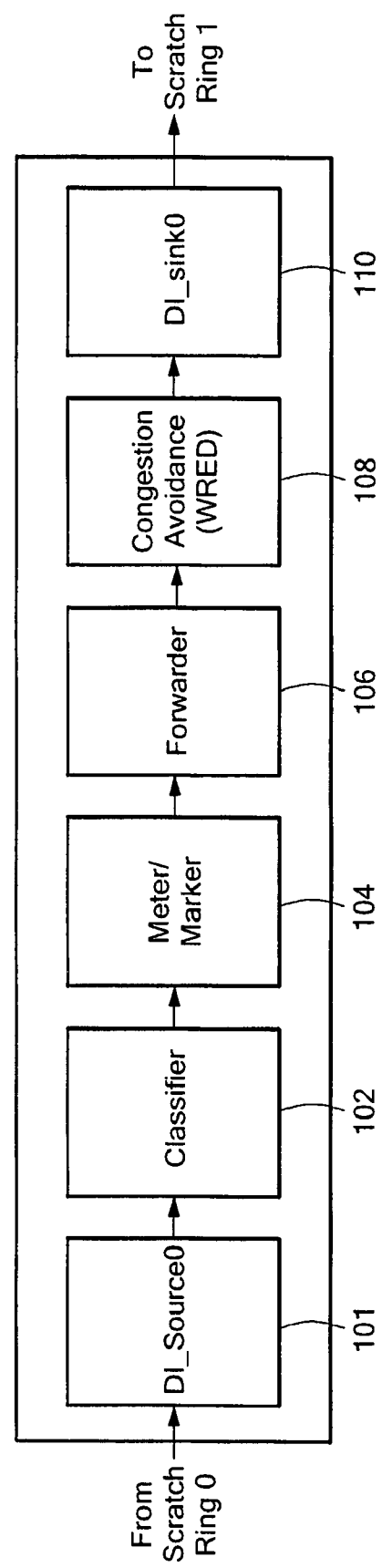
FIG. 5 shows an exemplary implementation of the functional pipeline (of FIG. 4).

In one embodiment, as shown in FIG. 5, the functional pipeline 94 involves the execution of the following microblocks: a source ("dl_source[ ]") microblock 101, a classifier microblock 102, a meter microblock 104, a forwarder microblock 106; a congestion avoidance microblock 108 (implemented to perform, for example, the Random Early Detection or "RED" algorithm, or Weighted RED ("WRED"), as shown); and a sink ("dl_sink[ ]") microblock 110. Thus, all four MEs 1-4 are executing the same code.

In the illustrated example, the source microblock 101 reads data unit from the scratch ring 0. The classifier microblock 104 perform a classification, e.g., an IPv4 or IPv6 tuple classification, or multi-protocol label switching ("MPLS") classification. The meter microblock 10 is used to monitor bandwidth of a flow. It checks whether each incoming data unit is in profile or not. When a connection is made, a set of parameters are negotiated, e.g., Committed Information Rate (CIR) and Committed Burst Size (CBS), which define the bandwidth used by the flow. The metering function can be implemented according to any one of a number of known schemes, such as token bucket. The microblock 108, as dicussed above, uses a congestion avoidance algorithm such as the WRED algorithm to monitor network traffic loads in an effort to anticipate and avoid congestion at common network bottlenecks. At the end of WRED microblock processing, the block dl_sink[ ] microblock 110 enqueues information based on the results of the functional pipeline processing to the downstream scratch ring 1.

The microblocks 92, 96 and 98 perform receive processing, scheduling/queueing and transmit processing, respectively. For example, the threads of the receive context pipestage 92 parse headers and perform lookups based on the header information. Once the data has been processed, it is either sent as an exception to be further processed by the core 24, or stored in the DRAM 34 and enqueued by the queue manager of block 96 in a transmit queue by placing a link descriptor for it in a transmit queue associated with the transmit (forwarding port) indicated by the header/lookup. The transmit scheduler in block 96 schedules the enqueued data for transmit data processing by the Tx microblock 98, which then sends the data unit out onto the forwarding port indicated by the header/lookup information during the receive processing.

Collectively, the stages 101, 102, 104, 106, 108 and 110 form a functional pipeline, as noted earlier. The functional pipeline runs on four microengines in parallel, and each of the eight threads (threads 0 through 7) in each ME is assigned a different single data unit (for example, a packet or cell) for processing.

Some of the functional pipeline stages, such as microblocks 104 and 108, for example, operate on a "critical section" of microcode, that is, a code section for which only one ME thread has exclusive modification privileges for a global resource at any one time. These privileges protect coherency during read-modify-write operations. Exclusive modification privileges between MEs in a functional pipeline are handled by allowing only one ME to execute the critical code at a time. This architecture ensures that an ME transitions into a critical section stage only after a previous ME has completed its processing in the critical section. This mutual exclusion among the MEs ensures that data integrity is maintained.

The meter microblock 104 and WRED microblock 108 are critical sections that require mutual exclusivity to shared tables in external memory. Thus, when transitioning, for example, from the meter microblock 104 to the forwarder microblock 106, thread 0 of ME 2 of the meter microblock will not begin until all threads on ME 1 have completed the previous metering pipe stage. Thus, the microengines are staggered in time by one stage time to ensure that only one microengine is operating on critical data associated with a task (that is, has exclusive access to that critical section).

Although FIG. 5 shows two critical section microblocks (specifically, the meter and WRED microblocks) present in the functional pipeline 94, there could be any number of critical section microblocks, for example, only one or more than one. Also, there may be multiple functional pipelines with one or more critical code microblocks in the processor 12.

Techniques are employed during each critical code pipe stage in the functional pipeline 94 to optimize processing in critical section microblocks by controlling execution of the threads. Thread execution is controlled to improve performance of the system by: i) maintaining strict thread execution order; and ii) forcing threads to give up context whenever required. Specific techniques used to achieve these two objectives are described below.

The thread execution order is controlled via the inter-thread signaling. The next thread signal may be given by writing to the SAME_ME_SIGNAL CSR 82 (from FIG. 3). As shown in a table 120 of FIG. 6, a write to the SAME_ME_SIGNAL CSR 82 requires a write latency 122, a read latency 124 and a usage latency 126, specified in terms of instruction cycles. The write latency 122 specifies the minimum number of instruction cycles "j" from the write instruction ("local_csr_wr[ ]") to the time that the CSR is actually written. The write latency, shown in the table as having a minimum value of j=3, is of particular importance with respect to the thread execution order, as will be explained more fully below.

Figure 7:
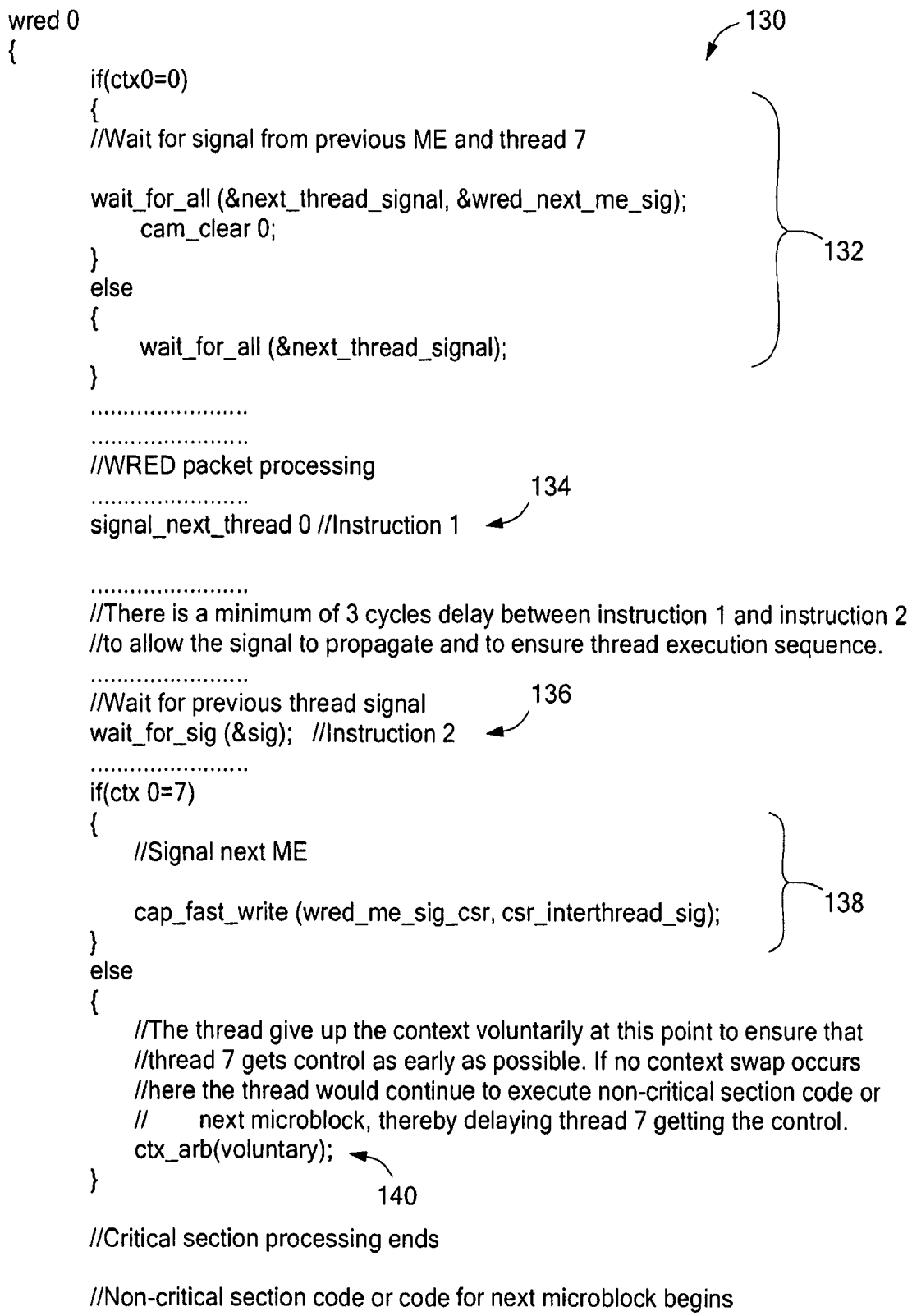
FIG. 7 shows an exemplary code implementation for executing a critical section of code in a functional pipeline.

Referring now to FIG. 7, an exemplary code implementation 130 for optimizing critical section block processing is shown. In the illustrative code, the critical section is taken to be the WRED microblock, but could be any critical section which executes on processors in different stages of a functional pipeline.

The WRED processing details have been omitted for simplicity, as it is the inter-thread signaling and inter-ME signaling that are of significance with respect to achieving the two performance optimizations (i) and (ii) discussed earlier.

Critical code portion 132 checks for signaling from the previous ME and last thread (thread 7) on that ME if the context is 0. Otherwise, it checks for signaling from the previous thread. If the WRED microblock uses the CAM 60 (shown in FIG. 2), it also clears the CAM of any data still in the CAM from the previous pipe-stage. Once the previous thread (or ME) signaling is received and after the thread has completed a first phase of WRED processing, it signals the next thread (using "instruction 1", indicated by reference number 134). Again, this may be achieved by writing to the SAME_ME_SIGNAL CSR. After a minimum delay equal of "j" cycles (the CSR write latency), the thread executes a "wait_for_sig[ ]" instruction ("instruction 2", indicated by reference numeral 136), which causes the thread to wait for signaling from the previous thread for a phase 2 of the WRED processing. The wait_for_sig[ ] instruction 136 generates a ctx_arb on the set of signals specified by the arguments in [ ]. The timing of these instructions is controlled so that the gap between execution of the instructions 1 and 2 is at least the minimum number of cycles "j" required by the write latency.

Once such signaling is received and after the thread has completed a second phase of WRED processing, the thread signals the next ME (to execute the critical section) if the thread corresponds to context 7 (critical code portion 138), and executes the instruction "ctx_arb[voluntary]" 140. The execution of instruction 140 causes the currently executing thread to give up the context voluntarily so that the last thread to execute on the ME, that is, thread 7, can begin execution as early as possible and provide the next ME signal. Consequently, the next ME can enter the critical section as early as possible. It should be noted that thread 7 need not execute "ctx_arb[voluntary]", as indicated in 140. Since thread 7 has already given a next ME signal, the execution of this instruction by thread 7 will make no difference because the next ME can begin processing the critical section without waiting for thread 7 of the current ME to perform the context swap.

As was described earlier, the ctx_arb[ ] instruction causes the following action on threads: a) swaps the currently running context out to let another context execute; and b) wakes up the swapped out context when the specified signal(s) is activated. The parameter 'voluntary' is a keyword that indicates that the thread should be put to sleep and woken when all the other threads have had a chance to run.

Figure 8:
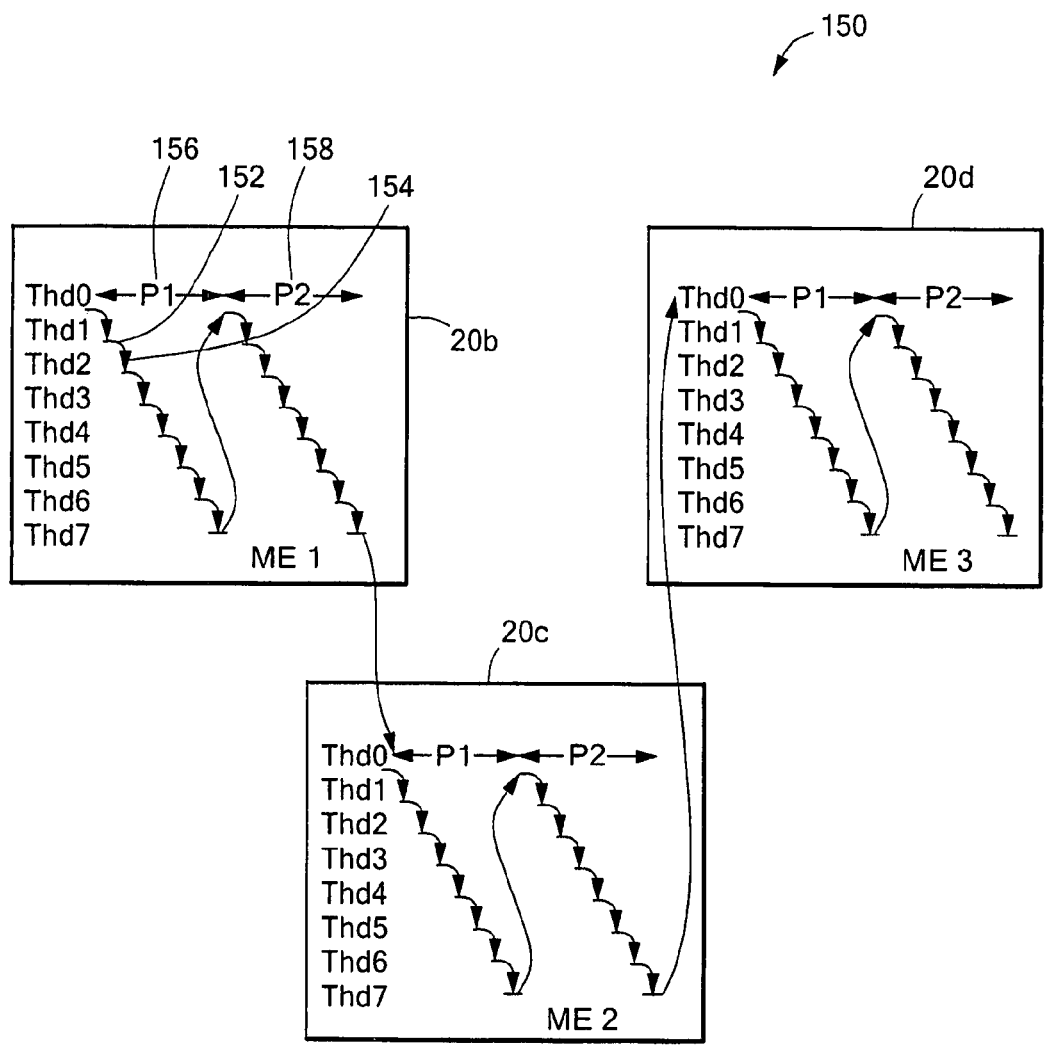
FIG. 8 shows inter-thread and inter-ME signaling during critical section processing by multiple microengines in a functional pipeline.

The instructions 1 and 2 are executed by all of the threads in each ME. Referring to FIG. 8, the working of the inter-thread and inter-ME signaling in a two-phase processing framework 150 for three MEs which execute the same critical section (like the WRED microblock or meter microblock) in a functional pipeline is as follows. The points in time in which instruction 134 and instruction 136 each begin execution are shown as points 152 and 154, respectively, with respect to thread 3, just as an example. The phases phase 1 (e.g., read operation) and phase 2 (e.g., modify-write) are indicated by reference numerals 156 and 158, respectively.

Beginning with ME1 (indicated by reference numeral 20b), thread 0 initially generates a self-signal to begin execution.

Thread 0 signals thread 1 after phase 1, that is, the read phase (instruction 1). Thread 0 executes an instruction which causes it to go to sleep and wait for a signal from thread 7 after phase 1, that is, the modify-write phase (instruction 2). Thread 1 waits for the phase 1 signal from thread 0. Thread 1 signals thread 2 after phase 1 (instruction 1). Thread 1 waits for signal from thread 0 after phase 2 (instruction 2). Thread 2 waits for the phase 1 signal from thread 1. Thread 2 signals thread 3 after phase 1 (instruction 1). Thread 2 waits for the signal from thread 1 after phase 2 (instruction 2). The processing and signaling continues in this manner all the way up to thread 7. Thread 7 waits for the phase 1 signal from thread 6, and signals thread 0 after phase 1 (instruction 1). Thread 7 waits for the signal from thread 6 after phase 2 (instruction 2). After the phase 2 processing in completed for all of the threads, thread 7 in ME1 signals thread 0 in the next ME, ME2 20c, to begin execution of the critical section. The processing and signaling repeats for ME1. When ME1 completes execution of the critical section, thread 7 in ME1 signals thread 0 in the next ME, shown as ME3 20d.

Thus, the threads execute in strict order, and each ME executes in turn, so that data integrity of the critical section is preserved. The strict sequential ordering of the execution of threads in a given pipestage is maintained by using local inter-thread signaling with appropriate delay to account for CSR write latency. Sequential ordering of thread execution sequence means that the threads execute in numerical (ID) order, i.e., thread 1 starts after thread 0, thread 2 starts after 1, and so on. Thread execution is said to be out of order if, for example, thread 0 starts after thread 3.

Any one of the microengines will be executing the critical section block at a given point in time. Thus, mutual exclusion is ensured since thread 0 in each microengine must wait for an inter-ME signal from the previous ME and an inter-thread signal from previous thread in the beginning of critical section microblock. All other threads in the microengine only wait for inter-thread signal from a previous thread.

Figure 9:
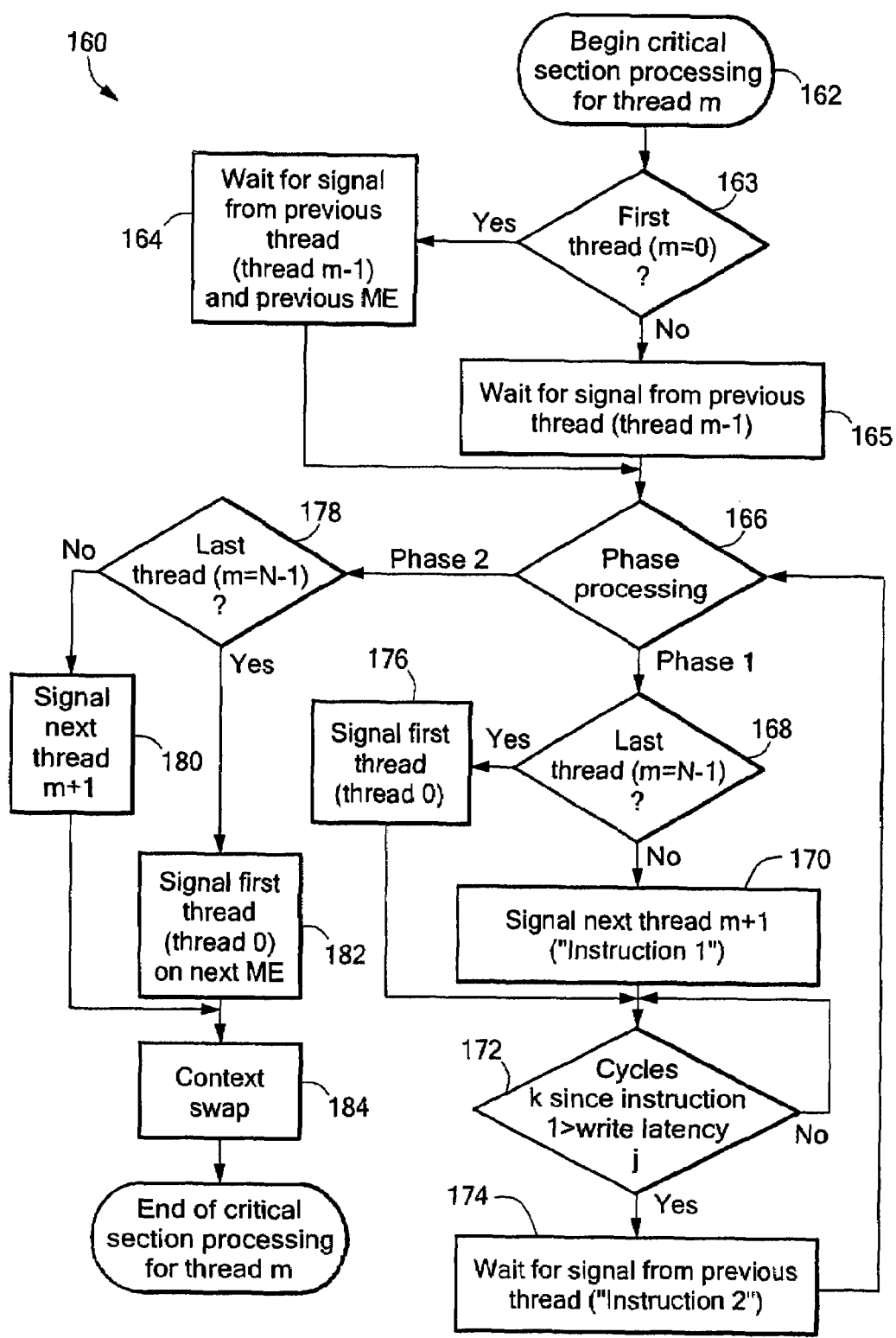
FIG. 9 is a flow diagram illustrating critical section execution by a single thread of an ME in a functional pipeline.

FIG. 9 illustrates an exemplary critical section/microblock pipestage program flow 160 (for a critical section execution) performed by a thread "m" (where m is a thread ID number in the range of 0 to N−1) of one of the functional pipeline MEs. The thread begins 162 with the critical section processing only when the thread receives a signal indicating that the thread can begin execution. The thread determines 163 if the thread is the first thread, that is, thread 0 (m=0). If the thread is thread 0, it waits 164 for a signal from the previous thread (thread m−1) or from the previous ME. If the thread is not thread 0, the thread waits 165 for a signal from the previous thread (thread m−1). Having received such signal, the thread performs 166 the phase processing (e.g., CAM lookup and/or external memory read for phase 1, or modify-write for phase 2). If the processing occurred for phase 1, it is determined 168 if the thread is the last thread (that is, thread 7). If the thread is not the last thread, the thread signals 170 the next thread (thread m+1) using instruction 1, as described earlier. The thread determines 172 when the required write latency delay has occurred and executes 174 the instruction 2, which causes the thread to wait for a signal from the previous thread when the previous thread has completed its phase 2 processing. Thus, when the thread receives the appropriate event signaling, that is, an event signal indicating that the previous thread has completed its processing, the thread wakes up and begins processing (for phase 2 now). If, at 168, it is determined that the thread is the last thread in the sequence, the thread signals 176 the first thread (that is, thread 0) instead of thread m+1 via "instruction 1".

Referring back to phase processing 166, if the executed phase processing is completed for phase 2, it is determined 178 if the thread is the last thread. If the thread is not the last thread, the thread signals 180 the next thread m+1. If the thread is the last thread, the thread instead signals 182 the first thread of the next ME. After either signaling 180 or 182, the thread performs a context swap 184, thus allowing the next thread, thread 0, on the next ME to begin execution of the critical section.

FIGS. 10A and 10B illustrate the impact of the CSR write latency on thread execution. As shown in FIG. 10A, if a currently executing thread, indicated in the example as thread 3 190, executes the instruction 2 (which causes it to wait for the next thread signal from previous thread 2) in a number of cycles k after instruction 1 (which causes thread 3 190 to signal thread 4 194) where k is less than the write latency, e.g., 3 cycles, then a thread other than thread 4 194 may begin executing after thread 3 190. In the illustrated example, thread execution order is lost, as thread 0 192 follows thread 3 190. In contrast, FIG. 10B shows that thread order execution is maintained, that is, thread 4 194 follows thread 3 190 when k is at least 3 cycles.

When thread ordering is lost, as shown in FIG. 10A, there is a delay in the time it takes the last thread to begin execution and, consequently, a delay in the next ME entering the critical section for execution. Such a delay may result in a stall on the next ME.

Figure 11A:
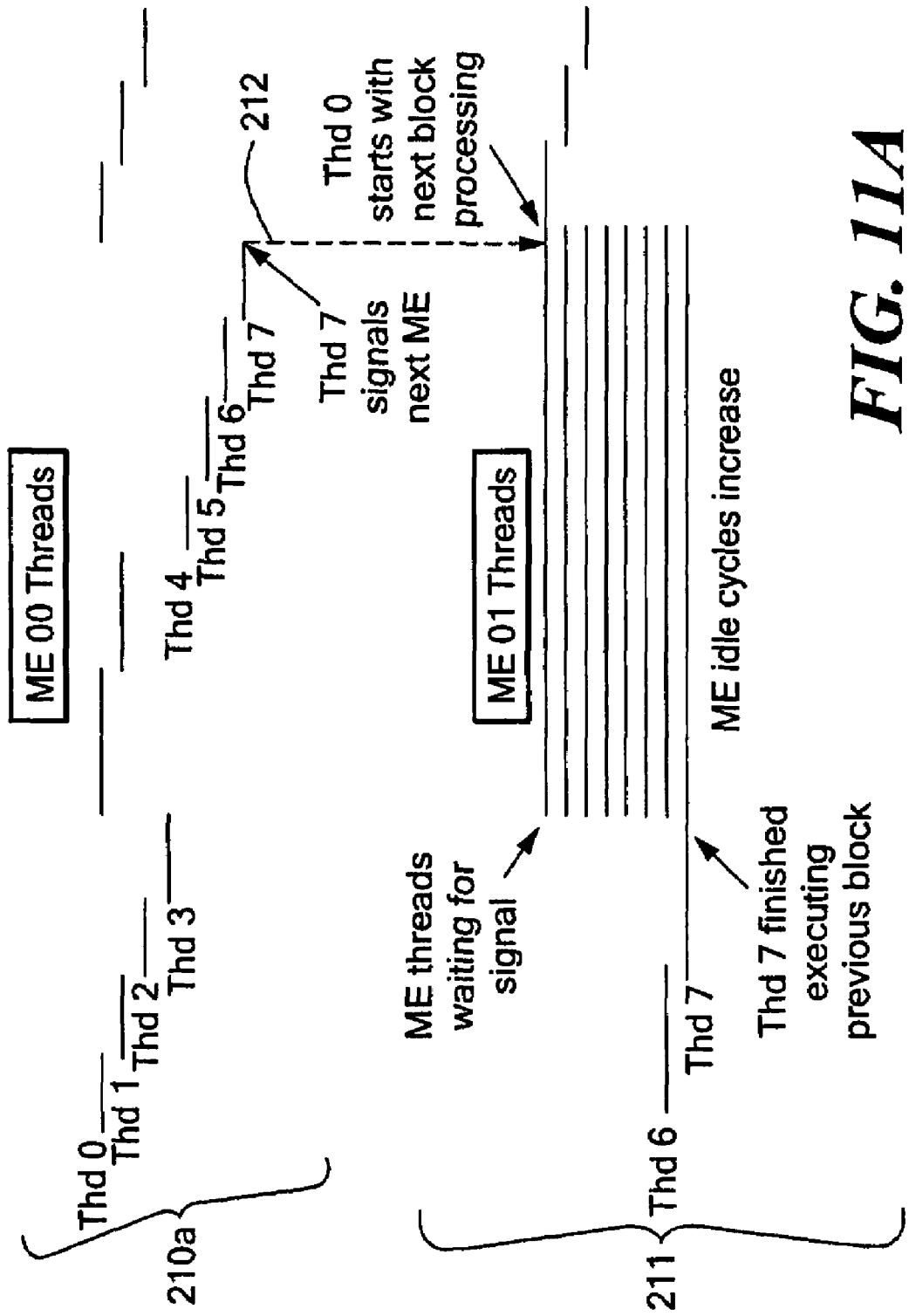
FIGS. 11A-11B show the impact of ordered thread execution on ME idle cycles.
Figure 11B:
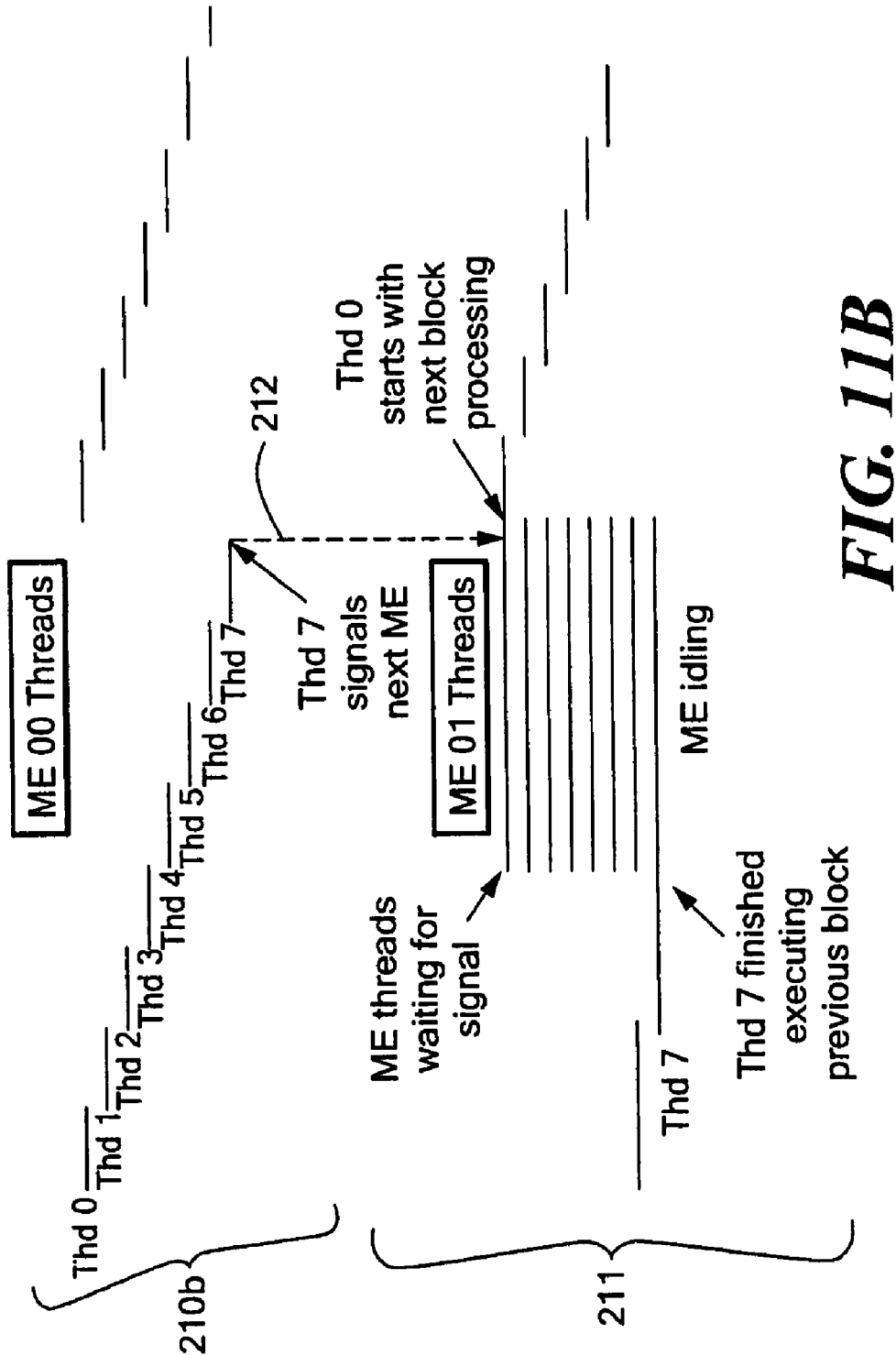

The impact of such a scenario is highlighted in FIGS. 11A and 11B with respect to two MEs, ME 0 and ME 1. Referring now to FIGS. 11A-11B, the microengine ME 0 is executing a critical section microblock, e.g., the meter microblock.

After ME 0 has completed execution, ME 1 will execute that same critical section microblock. As shown in both figures, ME 1 completes execution of a different microblock execution (which could be another critical section microblock, or a non-critical section microblock) and awaits a signal from ME 0 so that it can begin execution of the microblock currently being executed by ME 0. The processing in one ME can be faster than the other if the number of cycles consumed by particular microblock is less compared to the other or if the ME doesn't have any incoming data to process (in which case the ME performs NULL processing). This condition causes ME 1 to be idle until ME 0 finishes its microblock processing and gives the next ME signal to ME 1. Thus, ME 1 may need to execute some number of idle cycles until it receives a signal from thread 7 of ME 0 and thread 0 in ME 1 transitions to an executing state.

As shown in FIG. 11A, threads 210a on ME 0 execute out of order, as threads 0 and 1 follow thread 3 and execute before order is returned with the execution of threads 4 though 7. FIG. 11B shows threads on ME 0 210b executing in sequential order. Because ME 1 having threads 211 receives an inter-ME signal 212 from ME 0 earlier under the optimized conditions depicted in FIG. 11B (compared to those depicted in FIG. 11A), it can be seen that ME 1 requires fewer idle cycles when thread execution order is maintained.

Figure 12A:
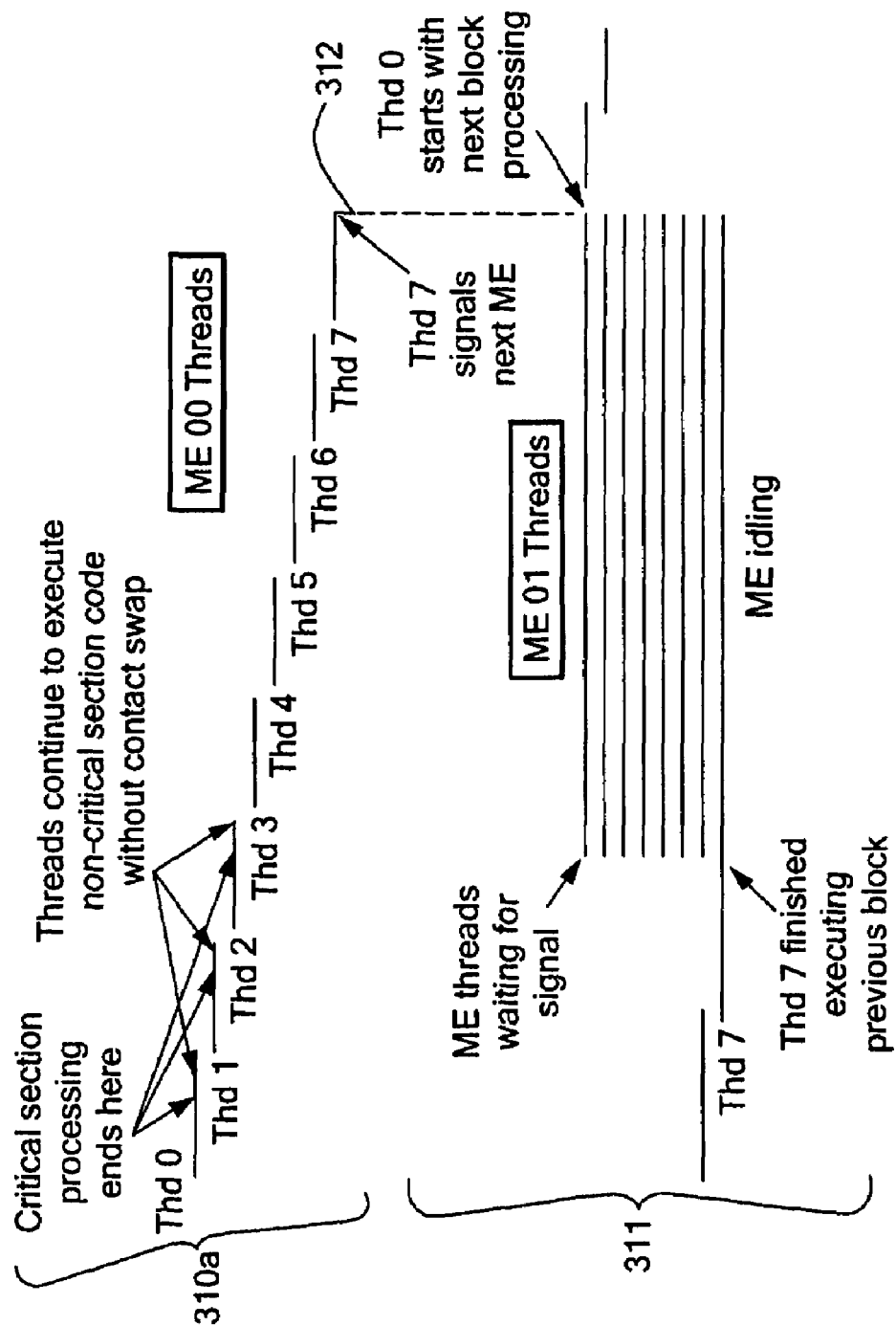
FIGS. 12A-12B show the impact of thread context swaps (after critical section execution) on ME idle cycles.
Figure 12B:
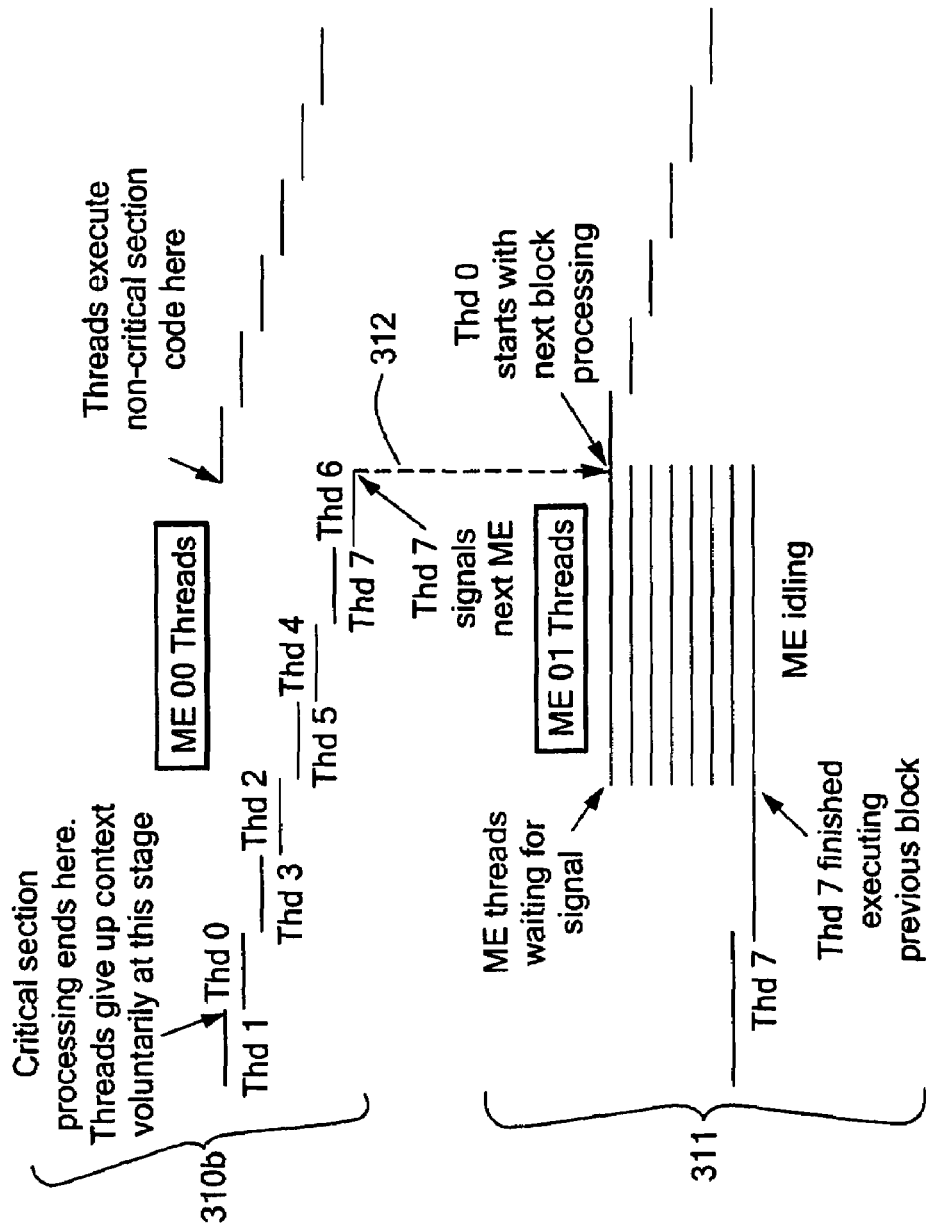

Such is also the case when context switching occurs, as illustrated in FIGS. 12A and 12B. In FIG. 12A, threads on ME 0 310a proceed with the execution of other code, e.g., some non-critical section code, immediately following the completion of the critical section processing without performing a context swap, thus delaying the inter-thread signaling to the next threads and ME enabling those threads and ME to begin execution of the critical section. In FIG. 12B, the threads on ME 0 310b promptly swap out to allow the next thread to execute, which means that thread 7 ends up signaling 312 to next ME (ME 1 having threads 311) at an earlier time than was the case under the circumstances depicted in FIG. 12A. Referring to both figures, it can be seen that the delay caused by the lack of context swap (shown in FIG. 12A) results in an increase in the number of idle cycles on the ME 1 as it waits to execute the critical section.

Collectively, FIGS. 10A-B, 11A-11B and 12A-12B illustrate the advantages of controlling thread execution using the thread ordering and context swap optimizations described herein. As a result of these optimizations, the overall system performance is greatly improved as a greater degree of parallelism is achieved among the microengines during processing.

Although the illustrated example of FIG. 5 shows meter and WRED tasks as critical section microblocks, other types of critical section microblocks could be used. For example, if the processor 12 operates on ATM traffic, receive processing may include multiple MEs running in a receive functional pipeline to operate at OC48 or more than OC48 line rates.

Figure 13:
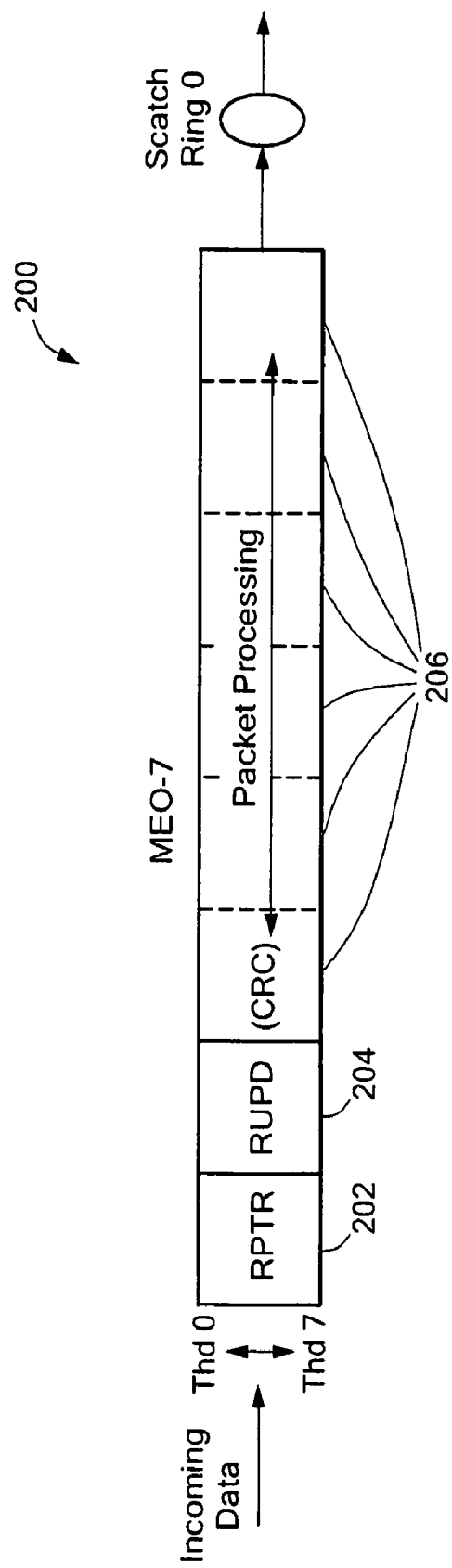
FIG. 13 is a diagram of another exemplary functional pipeline in which multiple MEs execute the same critical code.
Figure 2:
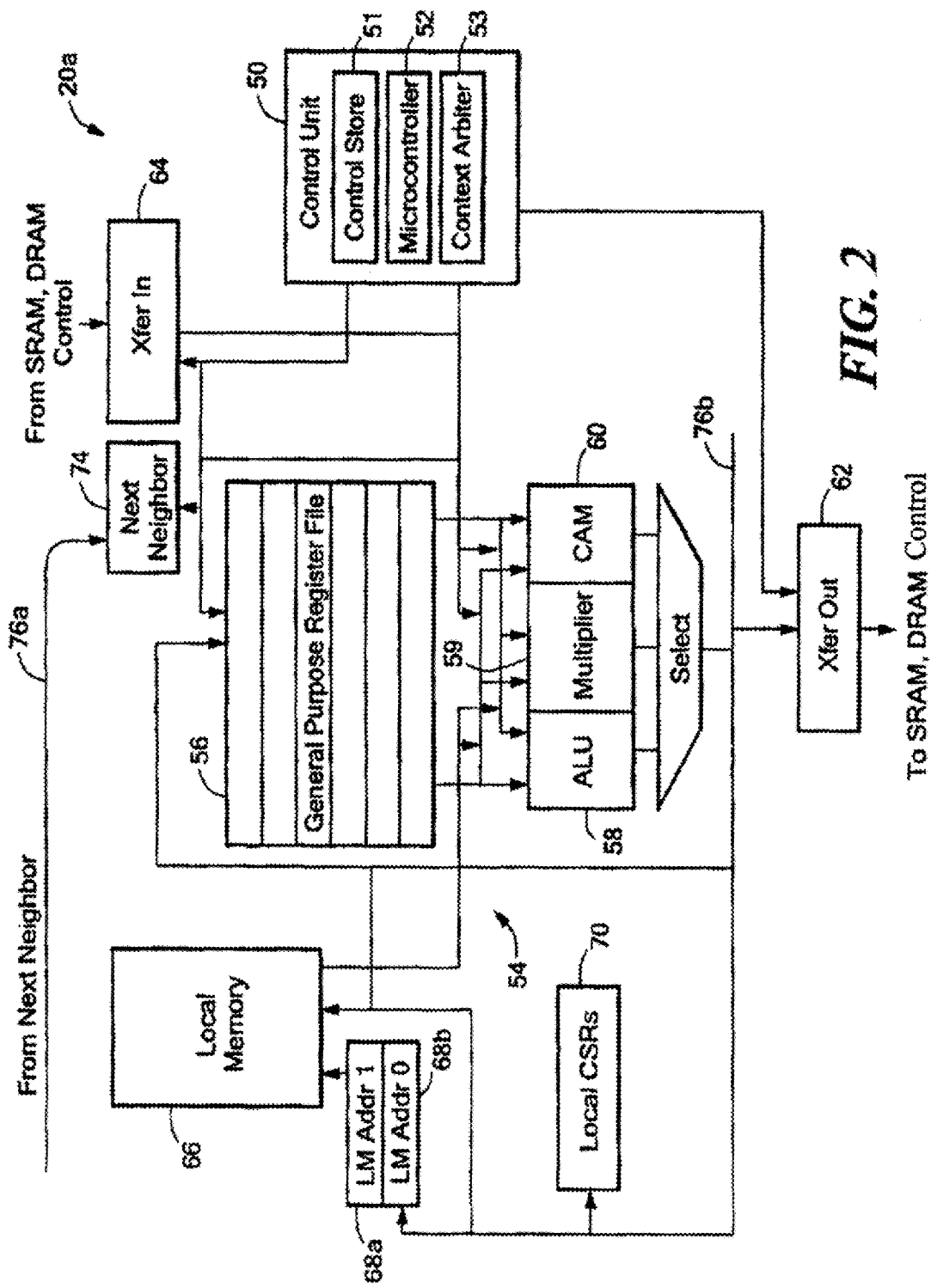
Figure 13:
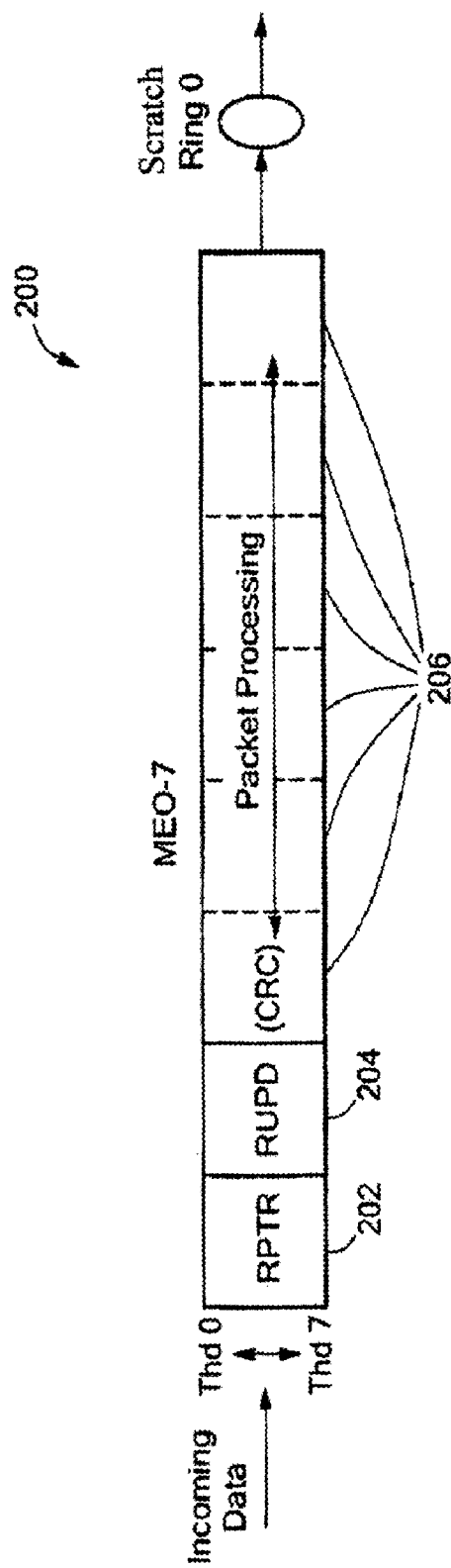

Referring to FIG. 13, such receive processing may be implemented as an Rx functional pipeline 200 having the following microblocks/stages: a re-assembly pointer search ("RPTR") 202, a re-assembly information update ("RUPD") 204 and receive processing stages 206 (which may include a Cyclic Redundancy Check or "CR" block, as shown). The RPTR, RUPD and processing pipe stages work together to re-assemble segmented packets back into complete packets. In this exemplary functional pipeline, the RUPD microblock 204 is a critical section as it modifies re-assembly state information maintained in SRAM and manages this data structure exclusively. Other possible critical section microblocks, such as traffic management, in some network applications, could be used as well.

Other embodiments are within the scope of the following claims.

What is claimed is:

1. A method comprising:
configuring processors with multiple threads of execution to execute a critical section of code, the processors operable to execute the critical section in turns, each processor completing execution of the critical section during their respective turn, the processors comprising a functional pipeline in a network processor; and
controlling the threads of execution of the processors to avoid occurrence of idle time between execution of the critical section by the processors by executing threads within a processor in a sequential order,
wherein the processors are operable to execute at least two of the critical sections of code and one of the critical sections of code comprises a metering microblock and the another of the critical sections of code comprises a congestion avoidance microblock.

2. The method of claim 1 wherein controlling comprises:
enabling the threads of execution on each of the processors to execute in the sequential order via inter-thread signaling.

3. The method of claim 2 wherein enabling comprises:
enabling each thread, when such thread is executing, to execute a first instruction to cause an inter-thread signal to a next thread to be generated; and
enabling the thread to execute a second instruction, which causes the thread to wait for an inter-thread signal from a previous thread, only after a write latency required by the first instruction.

4. The method of claim 3 wherein the write latency comprises at least three instruction cycles.

5. The method of claim 3 wherein the processors each comprise a register through which an inter-thread signal to the next thread is given.

6. The method of claim 5 wherein the processors each comprise registers through which inter-thread, inter-processor signaling can occur.

7. The method of claim 6 wherein the processors use external registers to enable inter-thread, inter-processor signaling to occur.

8. The method of claim 2 wherein controlling further comprises:
enabling each thread of execution on each of the processors to relinquish control of a program comprising the critical section as soon as the critical section has been executed.

9. The method of claim 1 wherein controlling comprises:
enabling each thread of execution on each of the processors to relinquish control of the program comprising the critical section as soon as the critical section has been executed.

10. The method of claim 1 wherein the processors comprise a functional pipeline, and one or more of the critical sections of code are executed in the functional pipeline.

11. The method of claim 10 wherein one of the one or more critical sections of code comprises an Asynchronous Transfer Mode (ATM) receive processing microblock.

12. The method of claim 10 wherein one of the one or more critical sections comprises an ATM traffic management processing microblock.

13. A article comprising:
a storage medium having stored thereon instructions that when executed by a machine result in the following:
configuring processors with multiple threads of execution to execute a critical section of code, the processors operable to execute the critical section in turns, each processor completing execution of the critical section during their respective turn, the processors comprising a functional pipeline in a network processor; and
controlling the threads of execution of the processors to avoid occurrence of idle time between execution of the critical section by the processors by executing threads within a processor in a sequential orders,
wherein the processors are operable to execute at least two of the critical sections of code and one of the critical sections of code comprises a metering microblock and the another of the critical sections of code comprises a congestion avoidance microblock.

14. The article of claim 13 wherein controlling comprises:
enabling the threads of execution on each of the processors to execute in the sequential order via inter-thread signaling.

15. The article of claim 14 wherein enabling comprises:
enabling each thread, when such thread is executing, to execute a first instruction to cause an inter-thread signal to a next thread to be generated; and
enabling the thread to execute a second instruction, which causes the thread to wait for an inter-thread signal from a previous thread, only after a write latency required by the first instruction.

16. The article of claim 13 wherein controlling comprises:
enabling each thread of execution on each of the processors to relinquish control of the program comprising the critical section as soon as the critical section has been executed.

17. A network processor comprising:
a processor; and
multi-threaded processors, having threads of execution, configurable by the processor to execute a critical section of code and operable to execute the critical section in turns, each processor completing execution of the critical section during their respective turn, the multi-threaded processors comprising a functional pipeline in the network processor; and
wherein the threads of execution of the multi-threaded processors are controllable to avoid occurrence of idle time between execution of the critical section by the multi-threaded processors by executing threads within a processor in a sequential order,
wherein the multi-threaded processors are operable to execute at least two of the critical sections of code and one of the critical sections of code comprises a metering microblock and the another of the critical sections of code comprises a congestion avoidance microblock.

18. The network processor of claim 17 wherein each thread, when such thread is executing, is controllable to execute a first instruction to cause an inter-thread signal to a next thread to be generated, and the thread is further controllable to execute a second instruction, which causes the thread to wait for an inter-thread signal from a previous thread, only after a write latency required by the first instruction.

19. A network processor of claim 17 wherein each thread of execution on each of the multi-threaded processors is controllable to relinquish control of the program comprising the critical section as soon as the critical section has been executed.

20. A system comprising:
- a memory system to store a critical section of code;
- processors, coupled to the memory system, having multiple threads of execution to execute the critical section of code, the processors operable to execute the critical section in turns, each processor completing execution of the critical section during their respective turn, the processors comprising a functional pipeline in a network processor; and
- wherein the threads of execution of the processors are controllable to avoid occurrence of idle time between execution of the critical section by the processors by executing threads within a processor in a sequential orders,
- wherein the processors are operable to execute at least two of the critical sections of code and one of the critical sections of code comprises a metering microblock and the another of the critical sections of code comprises a congestion avoidance microblock.

21. The system of claim 20 wherein each thread, when such thread is executing, is controllable to execute a first instruction to cause an inter-thread signal to a next thread to be generated, and the thread is further controllable to execute a second instruction, which causes the thread to wait for an inter-thread signal from a previous thread, only after a write latency required by the first instruction.

22. The system of claim 20 wherein each thread of execution on each of the multi-threaded processors is controllable to relinquish control of the program comprising the critical section as soon as the critical section has been executed.

* * * * *

UNITED STATES PATENT AND TRADEMARK OFFICE
CERTIFICATE OF CORRECTION

PATENT NO. : 7,376,952 B2
APPLICATION NO. : 10/662242
DATED : May 20, 2008
INVENTOR(S) : Katti et al.

It is certified that error appears in the above-identified patent and that said Letters Patent is hereby corrected as shown below:

On Sheet 2 of 14, in Fig. 2 (below Referral Numeral 62), line 1, delete "Contol" and insert -- Control --, therefor. As shown in the attached page.

On Sheet 14 of 14, in Fig. 13 (Right Hand Side), line 1, delete "Scatch" and insert -- Scratch --, therefor. As shown in the attached page.

In column 12, line 1, in Claim 13, before "article" delete "A" and insert -- An --, therefor.

In column 12, line 14, in Claim 13, delete "orders," and insert -- order, --, therefor.

In column 13, line 17, in Claim 20, delete "orders," and insert -- order, --, therefor.

Signed and Sealed this

Nineteenth Day of August, 2008

JON W. DUDAS
*Director of the United States Patent and Trademark Office*